United States Patent [19]

Moity

[11] 4,439,328

[45] Mar. 27, 1984

[54] WELL SERVICING FLUID ADDITIVE

[76] Inventor: Randolph M. Moity, 208 Interlaken Dr., New Iberia, La. 70560

[21] Appl. No.: 334,837

[22] Filed: Dec. 28, 1981

[51] Int. Cl.³ .................................................. C09K 7/00
[52] U.S. Cl. .......................... 252/8.5 LC; 252/8.55 R; 252/8.5 M
[58] Field of Search .................... 252/8.5 LC, 8.55 R, 252/8.5 M

[56] References Cited

U.S. PATENT DOCUMENTS

| | | | |
|---|---|---|---|
| 2,756,209 | 7/1956 | Morgan | 252/8.5 LC |
| 2,811,488 | 10/1957 | Nestle et al. | 252/8.5 LC |
| 3,046,222 | 7/1962 | Phansalkar et al. | 252/8.55 R |
| 4,173,999 | 11/1979 | Messenger | 252/8.5 LC |
| 4,330,414 | 5/1982 | Hoover | 252/8.55 R |
| 4,392,964 | 7/1983 | House et al. | 252/8.55 R |

FOREIGN PATENT DOCUMENTS 2086923  5/1982  United Kingdom ........... 252/8.55 R

*Primary Examiner*—Christine M. Nucker
*Attorney, Agent, or Firm*—Roy F. House

[57] ABSTRACT

Disclosed is a fluid, pourable well servicing fluid additive comprising a water-soluble polymer, an alkaline earth metal base, and a fibrous material suspended in an oleaginous liquid with a gellant and, optionally, a dispersant therefor. The additive is useful in preparing spud muds, lost circulation pills, and spacer fluids during well servicing operations.

9 Claims, No Drawings

WELL SERVICING FLUID ADDITIVE

BACKGROUND OF THE INVENTION

The invention relates to a composition which is effective in: increasing the cuttings carrying capacity of a clay-containing drilling fluid; formulating spacer fluids for use in cementing operations in oil and gas wells; and for formulating lost circulation pills for use in well servicing applications.

It is generally agreed among those skilled in the art that a rotary system is an acceptable form of drilling an oil or gas well. This system depends upon the rotation of a string of drill pipe to the bottom of which is attached a multi-pronged drilling bit. The bit cuts into the earth causing the cuttings to accumulate as drilling continues. As a result, a fluid must be used to carry these cuttings to the surface for removal, thus allowing the bit to continue functioning and the bottom hole to be kept clean and free of cuttings at all times. Drilling systems other than the rotary system are sometimes employed during drilling operations. Nevertheless, these systems still require a drilling fluid to remove the borehole cuttings and to otherwise perform functions related to drilling fluids.

During the initial stages of drilling an oil and gas well, a large diameter borehole is desired. This necessitates the removal of a large volume of drill cuttings from the borehole, and thus the drilling fluid must have excellent carrying capacity as exhibited by a high yield point, and particularly a high yield point to plastic viscosity ratio.

The characteristics of the mud used for spudding-in a well vary widely over the world. Some locations are spudded-in through conductor pipe already cemented in the collar, and some locations require that the length of the kelly and a few joints of drill pipe be drilled down, in order to cement one or more joints of conductor casing. With the latter wells, the circulation is frequently carried through a ditch dug in the surface soil. The cement drilled out of the conductor contaminates the spud mud. Most of the contaminated mud will be discarded before drilling continues below the conductor.

Frequently the formations near the surface are soil, loose sand, and gravel. The mud should form a wall cake on these formations to prevent caving and hole enlargement, and should have body enough to carry out the cuttings and gravel encountered in this fast drilling section. When the make-up water is soft and the formations near the surface make mud, an ideal situation exists for spudding in a well. When conditions are otherwise bentonite or clay is mixed to make spud mud, and sometimes the make-up water must be treated with soda ash and lime.

With fair make-up water, 20 sacks of bentonite will make from 80 to 100 bbl. of mud; 20 sacks of premium clay will make from 45 to 65 bbl. of mud; and 20 sacks of the cheaper drilling clays will make from 10 to 20 bbl. of mud. Annular velocities are low in the large conductor pipe hole, and many operators use enough clay to make a thick mud that will more readily remove surface sands and gravels. Generally, only bentonite or premium clay is used. Usually the spud mud will be mixed by one member of the crew while the final rigging up is being done. Water is run into the pit and circulated through the hopper where the clay is carefully mixed at a rate of from 2 to 15 minutes per sack. If any clay balls up and floats on the surface, it indicates that the mixing has probably been at too fast a rate, and the guns must be used to stir in the clay. The mixing of clay should be continued until a funnel viscosity of 30 to 35 seconds is reached. The viscosity will increase as the mud ages and picks up solids while drilling.

Many operators mix clay and water and then add lime. Lime thickens the mud and less clay is required to build any desired viscosity. The spud mud is usually discarded or watered after surface pipe is set; hence the addition of lime is not as objectionable as with muds used in deeper drilling, where good filtration properties are desired.

Circulation in a drilling well can be lost into fractures induced by excessive mud pressures, into pre-existing open fractures, or into large openings with structural strength. Depending on the cause of loss, remedial measures involve reducing the pressure exerted by the circulating fluid, or plugging the openings through which the drilling fluid is escaping. The openings may be closed by introducing a slurry which becomes stiff, or by introducing a bridging or plugging solid so that normal filtration can occur. Often the bridging or plugging solids are included in compositions that form stiff plugs or set hard. Many materials have been used to prevent or overcome lost circulation, including asbestos, bagasse, flax shives, hog hair, leather, mineral wool, paper, wood products, and cotton products.

Spacer fluids are used in well servicing operations to prevent the inter-mixing of two fluids, such as oil mud and water mud, drilling fluids and cement, drilling fluids and completion fluids, and the like. Spacer fluids are generally viscous and may be of high density depending on the density of the fluids which it is desired to keep separated.

It is an object of this invention to provide a well servicing fluid additive which is effective in enhancing the cuttings carrying capacity of an aqueous clay-containing drilling fluid.

It is another object of this invention to provide an additive which can be easily mixed with water to form a lost circulation pill or spacer fluid.

It is still another object of this invention to provide a method of alleviating lost circulation in a borehole and a method of preventing the admixing of two dissimilar fluids in a borehole.

While the invention is susceptible of various modifications and alternative forms, specific embodiments thereof will hereinafter be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

The compositions can comprise, consist essentially of, or consist of the stated materials. The method can comprise, consist essentially of, or consist of the stated steps with the stated materials.

SUMMARY OF THE INVENTION

The present invention provides a fluid, pourable well servicing fluid additive comprising an oleaginous liquid, a water-soluble polymer, an alkaline earth metal base, a gellant for the oleaginous liquid, optionally a dispersant for the gellant, and a fibrous material, all as hereinafter set forth. The preferred additive is an easily handable, pourable slurry or suspension which readily mixes with aqueous liquids to increase the pH, build viscosity, increase the cuttings carrying capacity, and flocculate any clays contained in the aqueous liquid.

DESCRIPTION OF THE PREFERRED EMBODIMENTS

The oleaginous liquid useful in the present invention may be any organic liquid which has no substantial swelling effect on the water-soluble polymer utilized in the invention. The preferred oleaginous liquid is a hydrocarbon, most preferably a distilled petroleum fraction having a low viscosity and high flash and fire points. Suitable hydrocarbons include light mineral oils, diesel fuel, kerosene, odorless mineral spirits, and the like.

The polymer useful in this invention is a water dispersible or soluble hydrophilic colloid selected from the group consisting of cellulose derivatives, gum ghatti, gum arabic, gum tragacanth, locust bean gum, gum karaya, guar gum, carrageenan, algin, biopolymers, and mixtures thereof. These polymers may be used unmodified, as normally isolated from their source materials, or they may be modified by hydroxyalkylation, carboxyalkylation, or mixed hydroxyalkylation carboxyalkylation to form ether derivatives, such as hydroxyethyl ethers, hydroxypropyl ethers, carboxymethyl ethers, mixed hydroxyethyl carboxymethyl ethers, and the like, as is well known in the polymer art. Many of these derivatives form clear solutions in water. Thus the term water-soluble polymer is intended to mean polymers which form collodial solutions or colloidal dispersions in water.

The sources of these gums are well known, Thus gum ghatti is derived from an exudate of the *Anogeissus latifolia* tree of the Combretaccae family. Gum arabic is derived from an exudate of the acacia tree. Gum tragacanth is derived from an exudate of various species of shrubs belonging to the genus Astragalus. Gum karaya is derived from an exudate of the *Sterculia ureus* tree. Locust bean gum is derived from the fruit of the carbo tree (*Ceratonia siliqua*). Guar gum is derived from the seeds of two annual leguminous plants, *Cyamopsis tetragonalobus* and *Cyamopsis psoraloides*. Algin is derived from all brown seaweeds, of the family Phaeophyceae, although principally from the giant kelp *Macrosystis pyrifera*. Carrogeenan is derived from certain species of red seaweeds of the Gigartinaceae, Solieriaceae, Phyllophoraceae, and Hypneaceae families.

The biopolymers useful in this invention are biopolymers produced by a process comprising the microbial transformation of carbohydrate with a microorganism to obtain a polymeric material which differs from the parent polymeric material in respect of composition, properties and structure. Suitable carbohydrates include sugars such as pentoses or hexoses, for example glucose, sucrose, fructose, maltose, lactose, galactose, and starches, for example soluble starch, corn starch and the like. Crude products having a high carbohydrate concentration can be used. Among suitable materials there may be mentioned raw sugar, crude molasses and the like. Microorganisms suitable for effecting the microbial transformation of the carbohydrates may be for example plant pathogenic bacteria such as plant pathogens which produce exudates of the site of lesions on infected plants. Typical of such microoganisms are the species of the genus Xanthomonas. Thus, for example, a heteropolysaccharide biopolymer may be prepared from glucose by the action of *Xanthomonas campestris* (XC polymer). Commercially available xanthan gum biopolymers can be obtained from Kelco Div., Merck & Co., Inc. under the trademark of "Kelzan" and General Mills, Inc. under the trademark "Biopolymer XB 23". Other species of Xanthomonas bacteria which are useful in preparing the biopolymers include *Xanthomonas phaseoli, Xanthomonas mulvacearn, Xanthomonas carotae, Xanthomonas translucens, Xanthomonas hederae* and *Xanthomonas papavericoli*. See for example Jordan U.S. Pat. No. 3,748,201, incorporated herein by reference. Other biopolymers, so-called synthetic gums, which are useful in this invention are: gum dextran synthesized by the action of the bacterium known as genus Leuconostoc Van Tieghemend on sucrose, as described by Bailey et. al. in U.S. Pat. No. 2,360,327; phosphorylated mannan synthesized by the action of the yeast Hansenula holstii NRRL-Y2448 on glucose as disclosed in United States Department of Agriculture, Agricultural Research Service, Northern Utilization Research and Development Division, Peoria, Ill., Bulletin CA-N-7, October, 1958; gums produced by the action of diphtheriodic bacteria such as Arthrobacter viscous NRRL B-1973 and Arthrobacter viscous NRRL B-1797 as disclosed in Cadmus et al. U.S. Pat. No. 3,228,855; gum produced by the action of methylomonas mucosa as described in Finn et. al. U.S. Pat. No. 3,923,782; gum produced by the action of *Erwinia tahitica* as disclosed in Kang et. al. U.S. Pat. No. 3,933,788; and gum produced by the action of *Azotobacter indicus* var. Myxogenes as disclosed in Kang et. al. U.S. Pat. No. 3,960,832.

Accordingly, the invention provides a well servicing fluid additive wherein the polymer may comprise gum ghatti, gum arabic, gum tragacanth, locust bean gum, gum karaya, guar gum, carrageenan, algin, biopolymers, hydroxyethyl cellulose, hydroxyethyl ghatti gum, hydroxyethyl arabic gum, hydroxyethyl tragacanth gum, hydroxyethyl locust bean gum, hydroxyethyl karaya gum, hydroxyethyl guar gum, hydroxyethyl carrageenan, hydroxyethyl alginate, hydroxyethyl xanthan gum, carboxymethyl cellulose, carboxymethyl ghatti gum, carboxymethyl arabic gum, carboxymethyl tragacanth gum, carboxymethyl locust bean gum, carboxymethyl karaya gum, carboxymethyl guar gum, carboxymethyl carrageenan, carboxymethyl alginates, carboxymethyl xanthan gum, hydroxyethyl carboxymethyl cellulose, hydroxyethyl carboxymethyl ghatti gum, hydroxyethyl carboxymethyl arabic gum, hydroxyethyl carboxymethyl tragacanth gum, hydroxyethyl carboxymethyl locust bean gum, hydroxyethyl carboxymethyl karaya gum, hydroxyethyl carboxymethyl guar gum, hydroxyethyl carboxymethyl carrageenan, hydroxyethyl carboxymethyl alginates, hydroxyethyl carboxymethyl xanthan gum, hydroxypropyl cellulose, hydroxypropyl ghatti gum, hydroxypropyl arabic gum, hydroxypropyl tragacanth gum, hydroxypropyl bean gum, hydroxypropyl karaya gum, hydroxypropyl guar gum, hydroxypropyl carrageenan, hydroxypropyl alginates, hydroxypropyl xanthan gum, and mixtures thereof.

The preferred polymers for use in this invention are hydroxyethyl cellulose (HEC), carboxymethyl cellulose (CMC), carboxymethyl hydroxyethyl cellulose (CMHEC), and mixtures thereof, most preferably HEC. These compositions are best described in terms of "D.S." (degree of substitution) and "M.S." (molar substitution based on hydroxyethyl groups).

The purpose of the following two paragraphs is to explain the use herein and in the prior art of the terms "degree of substitution" (D.S.") and "M.S."

There are three hydroxyl groups in each anhydroglucose unit in the cellulose molecule. D.S. is the average number of hydroxyl groups substituted in the cellulose per anhydroglucose unit. M.S. is the average number of moles of reactant combined with the cellulose per anhydroglucose unit. For the alkyl, carboxyalkyl, or acyl derivatives of cellulose the D.S. and M.S. are the same. For the hydroxyalkyl derivatives of cellulose, the M.S. is generally greater than the D.S. The reason for this is that each time a hydroxyalkyl group is introduced into the cellulose molecule, an additional hydroxyl group is formed which itself is capable of hydroxyalkylation. As a result of this, side chains of considerable length may form on the cellulose molecule. The M.S./D.S. ratio represents the average length of these side chains. Thus, from the foregoing it will be seen that the D.S. of a cellulose derivative can be no higher than 3, whereas the M.S. may be considerably higher than 3, depending on the extent to which side chains are formed.

For the mixed ethers involved herein (i.e., CMHEC), the first value given is the carboxymethyl D.S. and the second value given is the hydroxyethyl M.S. Two types of CMHEC which are commercially available and which have been used for several years are CHMEC of 0.3 carboxymethyl D.S. and 0.7 hydroxyethyl M.S., as well as CMHEC of 0.4 carboxymethyl D.S. and 0.3 hydroxyethyl M.S. These polymers are referred to as CMHEC 37 and CMHEC 43, respectively. CMHEC 420 has a carboxymethyl D.S. of 0.4 and a hydroxyethyl M.S. of 2.

In the present invention, the M.S. for polyethoxylated cellulose ethers such as HEC is in the broad range of 0.3 to 5, preferably 2 to 3. Thus, a hydroxyethyl cellulose with a M.S. of 3 is more suitable than a hydroxyethyl cellulose ether with M.S. equal to 1.5.

The alkaline earth metal base which is useful in this invention is selected from the group consisting of calcium oxide, calcium hydroxide, magnesium oxide, and mixtures thereof, preferably magnesium oxide and/or calcium hydroxide.

The gellant useful in this invention may be any material which will disperse in the oleaginous liquid to effectively suspend the non-liquid components of the additive. The preferred gellant is an organophilic clay although other materials such as colloidal silicas and the like can be used.

The organophilic clays preferred for use in this invention comprise the reaction product of a smectite clay and an organic quaternary compound.

The smectite clay must have a cation exchange capacity of at least 75 milliequivalents per 100 grams of 100% active clay. The preferred smectite clay is montmorillonite, particularly the naturally occurring Wyoming variety of swelling bentonite. Other smectite clays which may be useful in practicing this invention are hectorite and saponite. The clays may be converted to the sodium form if they are not already in this form. This can conveniently be accomplished by preparing an aqueous clay slurry and passing the slurry through a bed of cation exchange resin in the sodium form, optionally with centrifugation to remove the non-clay impurities from the smectite clay, and spray drying the slurry to obtain a particulate form of sodium exchanged clay. Alternatively the clay can be mixed with water and a soluble sodium compound such as sodium bicarbonate, sodium carbonate, sodium hydroxide and the like, optionally with an alkaline earth metal compound selected from the group consisting of magnesium oxide, magnesium carbonate, magnesium hydroxide, calcium oxide, calcium hydroxide, and mixtures thereof, and shearing the mixture such as with a pugmill or extruder. The smectite clay may be synthesized utilizing a hydrothermal synthesis process, as is well known, however, such clays are too expensive for most industrial uses.

The cation exchange capacity of the smectite clay can be determined by the well known ammonium acetate method.

The preferred quaternary compounds comprise a quaternary ammonium salt having the structural formula

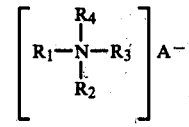

wherein $R_1$, $R_2$, $R_3$, and $R_4$ are independently selected from the group consisting of $C_aH_{2a+1-x}B_x$, $C_bH_{2b-1-x}B_x$, $C_6H_{5-x}B_xCH_2$, and mixtures thereof, $1 \leq a \leq 30$, $3 \leq b \leq 30$, $0 \leq x \leq 2$, B is a radical selected from the group consisting of OH, Cl, Br, $C_6H_5$, and mixtures thereof, and A is a charge balancing anion, provided that at least one R contains at least 12 carbon atoms, and $R_1$, $R_2$, $R_3$, and $R_4$ collectively contain at least 20 carbon atoms. Most preferably $x=0$, and B is OH when $x>0$. A is preferably selected from the group consisting of Cl, Br, I, $NO_2$, OH, $CH_3SO_4$, and mixtures thereof, most preferably Cl.

Exemplary preferred quaternary ammonium cations are selected from the group consisting of trimethyl octadecyl ammonium, trimethyl hydrogenated tallow ammonium, trimethyl ricinoleyl ammonium, dimethyl didodecyl ammonium, dimethyl dioctadecyl ammonium, dimethyl dicoco ammonium, dimethyl dihydrogenated tallow ammonium, dimethyl diricinoleyl ammonium, dimethyl benzyl octadecyl ammonium, dimethyl benzyl hydrogenated tallow ammonium, dimethyl benzyl ricinoleyl ammonium, methyl benzyl dioctadecyl ammonium, methyl benzyl dihydrogenated tallow ammonium, methyl benzyl diricinoleyl ammonium, methyl benzyl dicoco ammonium, methyl dibenzyl octadecyl ammonium, methyl dibenzyl hydrogenated tallow ammonium, methyl dibenzyl ricinoleyl ammonium, methyl dibenzyl coco ammonium, methyl trioctadecyl ammonium, methyl trihydrogenated tallow ammonium, methyl triricinoleyl ammonium, methyl tricoco ammonium, dibenzyl dicoco ammonium, dibenzyl dihydrogenated tallow ammonium, dibenzyl dioctadecyl ammonium, dibenzyl diricinoleyl ammonium, tribenzyl hydrogenated tallow ammonium, tribenzyl octadecyl ammonium, tribenzyl coco ammonium, tribenzyl ricinoleyl ammonium, and mixtures thereof.

The amount of the organic quaternary cationic compound added to the clay must be sufficient to render the resulting organoclay useful for its intended purpose. Generally there is a specific ratio of clay and quaternary compound which provides the optimum desired property in an oleaginous medium, and this ratio will vary depending on the characteristics of the oleaginous medium. Thus, in general, as the aromaticity of the oleaginous medium increases, the ME ratio decreases. The ME ratio (milliequivalent ratio) is defined as the number of milliequivalents of the quaternary cationic compound in the organophilic clay, per 100 grams of clay, 100% active clay basis.

The preferred organophilic clays of this invention have a ME ratio from about 75 to about 120. The optimum ME ratio will depend on the particular clay and cationic quaternary compound used to prepare the organophilic clay, and on the particular oleaginous liquid in which it is desired to utilize the organophilic clay. In general, it has been found that the gelling efficiency of organophilic clays in polar organic liquids increases as the ME ratio decreases. Conversely, the gelling efficiency of organophilic clays in non-polar oleaginous liquids increases as the ME ratio increases until an optimum is reached which is generally in the range from about 90 to about 120 depending on the particular oleaginous liquid to be viscosified.

Preferably the organophilic clay is selected from the group consisting of dimethyl dihydrogenated tallow ammonium bentonite, methyl benzyl dihydrogenated tallow ammonium bentonite, dimethyl benzyl hydrogenated tallow ammonium bentonite, and mixtures thereof.

The organophilic clays may be prepared by known processes such as those disclosed in Finlayson et al. U.S. Pat. No. 4,287,086, incorporated herein by reference for all purposes.

Generally the organophilic clays need a dispersant in order to effectively increase the viscosity of an oleaginous liquid. The most efficient and accepted dispersants have been found to be low molecular weight alcohols, ketones, nitroalkanes, and alkylene carbonates, and mixtures thereof with water. Thus the preferred dispersant is selected from the group consisting of alcohols containing from 1 to 3 carbon atoms, ketones containing from 3 to 4 carbon atoms, nitroalkanes containing from 1 to 3 carbon atoms, alkylene carbonates containing from 3 to 5 carbon atoms, and mixtures thereof with up to about 25% by weight of water.

The most particularly preferred dispersant is selected from the group consisting of methanol, acetone, propylene carbonate, and mixtures thereof with up to about 25% by weight water.

The fibrous materials which are useful in this invention may be either inorganic or organic.

The preferred inorganic fibers are any of the fibrous minerals known as asbestos. Representative amphibole group minerals are actinolite, anthophyllite, crocidolite, cummingtonite, gloucophane, hornblende, riebeckite, tremolite, and the like. Representative serpentine group minerals are amesite, antigorite, chrysotile, lizardite, and the like. Chrysotile is the most preferred inorganic fiber.

The organic fibrous materials are preferably degraded, water-insoluble vegetable fibers preferably derived from natural materials selected from the group consisting of cotton, wood, bagasse, peat, sphagum moss, animal hair, and mixtures thereof. These fibers must be degraded by mechanical means, chemical processes, or combinations thereof, such that at least 90% of the fibers, when slurried in water at a concentration of 5% by weight, will pass through a 100 mesh (Tyler series) screen, preferably at least 95% by weight of the fibers.

The fibrous materials, both inorganic and organic, may be degraded mechanically by grinding in a suitable mill capable of reducing the length of the fibers. The grinding may be in the dry state or in a liquid state. Urschel Laboratories, Inc. COMITROL size reduction machine can be used on dry fibers. Sweco, Inc. VIBRO-ENERGY grinding mill can be used on either dry or wet fibers. Advantageously the fibrous material is defibrated prior to, after, or concurrently with the size reduction processing. One such defibration process for bagasse and other vegetable fibers is disclosed in Botz U.S. Pat. No. 3,694,308, incorporated herein by reference for all purposes. Many fibrous materials can be defibrated by hydropulping them in an aqueous slurry containing various chemicals such as surface active agents, acids, bases, and the like. The fibrous materials can be degraded chemically by treating them with acids, oxidizing agents, and the like, in an aqueous slurry, preferably while hydropulping. See for example House U.S. Pat. No. 3,586,639, Dresher et. al. U.S. Pat. No. 3,409,499, and Naumann et. al. U.S. Pat. No. 3,297,516, all incorporated herein by reference for all purposes. Various other processes are disclosed in: German Offen. No. 1,910,100 (Chemical Abstracts 75:118964u, 1971); Netherlands Pat. Appln. No. 6,611,412 (Chemical Abstracts 67:46831h, 1967); S. African Pat. No. 67 03,114 (Chemical Abstracts 70:70836W, 1967); German Offen. No. 1,923,137 (Chemical Abstracts 72:68759w, 1970; Great Britain Pat. No. 1,092,738 (Chemical Abstracts 68:31664c, 1968); and South African Pat. No. 70 01,373 (Chemical Abstracts 75:38070j, 1971).

It is preferred for use in this invention that the organic fibrous material be defibrated and degraded such that at least 95% of the fibers wet wash through a 100 mesh screen. The most particularly preferred degraded, water-insoluble vegetable fiber is micronized cellulose, which is commercially available from Venture Chemicals, Inc., Lafayette, Louisiana, as VEN-FYBER 201.

It is preferred for use in this invention that the inorganic fibrous material have a fiber length less than a grade 6 Quebec asbestos classification, preferably a grade 7 or 8 fiber length.

The relative proportions of these materials in the well servicing fluid additive of this invention are given in the following table.

|  | Operable % by Weight | Preferred % by Weight |
| --- | --- | --- |
| Water-Soluble Polymer | 7.5–25 | 10–20 |
| Alkaline Earth Metal Base | 2.5–15 | 5–10 |
| Gellant | 0.5–3 | 1–2 |
| Dispersant | 0–1 | 0.2–1 |
| Fibrous Material | 5–20 | 8–15 |
| Oleaginous Liquid | 50–75 | 60–70 |

The concentrations of the components of the additive must be adjusted such that the additive remains a pourable liquid at ambient temperatures of 15° C. and above. In the liquid state, the additive readily mixes with aqueous liquids under low shear conditions to increase the viscosity and cuttings carrying capacity of the aqueous liquid, to flocculate any clays which are present in the aqueous liquid, and to elevate or maintain the pH above about 10. The water soluble polymer and fibrous material combine to increase the viscosity and yield point of an aqueous liquid. The alkaline earth metal base adjusts the pH and flocculates any clays present in the aqueous liquid. The gellant and dispersant, when used, increase the viscosity and yield point of the oleaginous liquid, thus keeping the solid water-soluble polymer, base, and fibrous material in suspension. Ideally, the additive will contain the largest concentration possible of the water-soluble polymer and fibrous material, within the concentration ranges given above, and still remain a pourable liquid. The concentration of gellant and dispersant need only be sufficient to prevent any hard packing of the solids in the additive upon storage.

I have found that this particular combination of materials when admixed with water forms viscous slurries which are useful as lost circulation pills and as spacer fluids. The additive readily mixes with water under low shear mixing conditions such as exist at many wellsite locations. For lost circulation pills, from about 1.5% to about 15% by volume of the additive should be mixed with water or drilling fluid and pumped down the drill pipe to the location at which circulation is lost. An effective seal is obtained when placed in the lost circulation zone. Other standard lost circulation materials may be mixed with the pill to add larger particles to the pill, if desired. When mixing the additive with water to form a lost circulation pill, from about 10% to about 15% by volume of the additive should be used. Lost circulation pills prepared from water base muds need only from about 1.5% to about 10% by volume of the additive of this invention. For use as a spacer fluid, from about 2.5% to about 7.5% by volume of the additive should be mixed with water and pumped down the drill pipe to the desired location in the borehole. The spacer fluid is followed, as is known in the art, with a fluid which is desired in the borehole and which it not to be mixed with the fluid already in the borehole.

The well servicing additive of this invention is also useful in formulating spud muds. Admixture of the additive with an aqueous suspension of clay, such as Wyoming-type bentonite or native mud-making clays, drastically increases the yield point of the suspension, hence the cuttings carrying capacity as is well known in the art. The additive is effective in both fresh water and in brackish, salty waters. Generally the spud mud will contain from about 5 pounds per 42 gallon barrel (ppb) to about 30 ppb of Wyoming bentonite or from about 15 to about 50 ppb of native mud-making clays, and from about 0.1 to about 2% by volume of the well servicing additive of this invention.

Preferably the spud mud will contain from about 10 to about 25 ppb. Wyoming bentonite and from about 0.25 to about 1.5% by volume of the well servicing additives of this invention.

The following examples illustrate specific preferred embodiments of the invention and are not intended to be limiting. The Wyoming bentonite used meets the American Petroleum Institute (API) specification for drilling mud grade bentonite. All testing was undertaken in accordance with API test procedures as specified in API Standard Test Procedure RP13B. The units for plastic viscosity (PV) are centipoise, and the units for yield point (YP) and gel strength (GS) are pounds per 100 square feet.

EXAMPLE 1

A well servicing fluid additive containing 67.5% kerosene, 0.49% methanol containing 25% water, 1.49% magnesium oxide, 4.48% calcium hydroxide, 1.49% of technical grade dimethyl dihydrogenated tallow ammonium bentonite, 13.8% hydroxyethyl cellulose, and 10.75% micronized cellulose was prepared as follows: To 650 gallons of kerosene in continuously stirred mixing tank was added 5 gallons of methanol containing 1 gallon of water; 100 pounds of magnesium oxide was added followed by 300 pounds of lime; 100 pounds of GELTONE organophilic clay was added and the mixing continued for 10 minutes thereafter; 925 lb. of NATROSOL 250HHR hydroxyethyl cellulose was added and the mixing continued for 10 minutes; and thereafter 720 pounds of VEN-FYBER 201 micronized cellulose was added and the mixing continued for 10 minutes.

The ability of this additive to increase the cuttings carrying capacity of a bentonite mud containing 20,000 parts per million (ppm) chlorides was evaluated as follows: A base mud containing 25 pounds of bentonite per 42 gallon barrel (ppb) of fresh water was prepared by mixing and allowed to age for 16 hours; an aliquot of this base mud was mixed with water, sodium hydroxide, sodium chloride, and finally this additive to produce spud muds having the compositions listed in Table 1. The API rheology characteristics of the muds were obtained after mixing 20 minutes on a Hamilton Beach mixer and cooling to 75° F. The data obtained are given in Table 1.

EXAMPLE 2

A well servicing fluid additive containing 65.5% kerosene, 0.6% methanol containing 11% water, 2% magnesium oxide, 5% calcium hydroxide, 1% dimethyl dihydrogenated tallow ammonium bentonite, 15.7% hydroxyethyl cellulose, and 10.2% micronized cellulose was prepared by the procedure of Example 1 using the following amounts of materials: 600 gallons of kerosene, 5.5 gallons of methanol containing 0.5 gallon water, 125 pounds of magnesium oxide, 325 pounds of lime, 65 pounds of BENTONE 34 organophilic clay, 1000 pounds of NATROSOL 250HHW, and 650 pounds of VEN-FYBER 201.

This additive was evaluated as in Example 1 except that the spud mud contained 10,000 ppm chlorides. The data are given in Table 1.

EXAMPLE 3

A well servicing fluid additive containing 71% kerosene, 0.5% methanol containing 6.25% water, 0.7% magnesium oxide, 5.1% lime, 2.2% technical grade dimethyl dihydrogenated tallow ammonium bentonite, 11% hydroxyethyl cellulose, and 9.5% micronized cellulose is prepared by the procedure of Example 1 using the following amounts of materials: 7 gallons of kerosene, 0.0525 gallons of methanol containing 0.0025 gallons of water, 0.5 pounds of magnesium oxide, 3.5 pounds of lime, 1.5 pounds of GELTONE organophilic bentonite, 7.5 pounds of CELLOSIZE HEC-25, and 6.5 pounds of VEN-FYBER 201.

This additive was evaluated as in Example 1 except that no sodium chloride was added to the spud mud. The data obtained are given in Table 1.

The data in Table 1 indicate that the additive of this invention was very effective in increasing the cuttings carrying capacity of the bentonite mud.

TABLE 1

Rheological Properties of the Well Servicing Fluid Additive of This Invention in Spud Muds with Varying Salinities and Concentrations of Bentonite

| Well Servicing Fluid Additive | % Volume cf Additive | NaOH lb/bbl | Bentonite lb/bbl | ppm Chlorides | PV | YP | GS 10-Sec. | GS 10-Min. |
|---|---|---|---|---|---|---|---|---|
| Example 1 | 0 | 0.25 | 12.5 | 20,000 | 2 | 8 | 4 | 5 |
| Example 1 | 0.5 | 0.25 | 12.5 | 20,000 | 4 | 16 | 6 | 7 |
| Example 1 | 1.0 | 0.25 | 12.5 | 20,000 | 8 | 26 | 7 | 8 |
| Example 1 | 0 | 0.25 | 20.0 | 20,000 | 3 | 9 | 4 | 7 |
| Example 1 | 0.5 | 0.25 | 20.0 | 20,000 | 4 | 14 | 8 | 11 |
| Example 1 | 1.0 | 0.25 | 20.0 | 20,000 | 7 | 35 | 12 | 14 |
| Example 2 | 0 | 0.25 | 12.5 | 10,000 | 2 | 9 | 3 | 5 |
| Example 2 | 0.5 | 0.25 | 12.5 | 10,000 | 4 | 15 | 3 | 6 |
| Example 2 | 1.0 | 0.25 | 12.5 | 10,000 | 6 | 25 | 4 | 5 |
| Example 2 | 0 | 0.25 | 20.0 | 10,000 | 3 | 13 | 9 | 10 |
| Example 2 | 0.5 | 0.25 | 20.0 | 10,000 | 6 | 20 | 18 | 19 |
| Example 2 | 1.0 | 0.25 | 20.0 | 10,000 | 7 | 62 | 19 | 21 |
| Example 3 | 0 | 0.25 | 12.5 | 0 | 5 | 14 | 15 | 25 |
| Example 3 | 1.0 | 0.25 | 12.5 | 0 | 22 | 51 | 31 | 26 |

EXAMPLE 4

A well servicing fluid additive containing 64% odorless mineral spirits, 0.3% propylene carbonate containing 7% water, 2.1% magnesium oxide, 5.4% calcium hydroxide, 0.6% dimethyl dihydrogenated tallow ammonium bentonite, 16.7% xanthan gum (XC polymer), and 10.9% defibrated, finely ground bagasse is prepared by the procedure of Example 1 using the following amounts of materials: 5.5 gallons of odorless mineral spirits, 0.0265 gallons of propylene carbonate containing 0.0015 gallon water, 1.25 pounds of magnesium oxide, 3.25 pounds of lime, 0.35 pounds of CLAY-TONE 40 organophilic bentonite, 10 pounds of KOD 85 xanthan gum, and 6.5 pounds of defibrated, micropulverized bagasse.

This additive, when mixed with water in the ratio of 1 part by volume additive to 8 parts by volume water, will form a viscous gel which is effective in alleviating lost circulation in a borehole as evidenced by its effectiveness in sealing a one-half inch bed of 20-40 mesh silica sand in an API filtration test cell.

EXAMPLE 5

A well servicing fluid additive containing 65.4% diesel oil, 0.35% acetone containing 8.6% water, 1.7% magnesium oxide, 4.3% calcium hydroxide, 0.85% dimethyl dihydrogenated tallow ammonium hectorite, 10.3% carboxymethyl cellulose, and 17.1% micronized cellulose is prepared by the procedure of Example 1 using the following amounts of materials: 5.5 gallons of diesel oil, 0.032 gallons of acetone containing 0.002 gallons of water, 1 pound of magnesium oxide, 2.5 pounds of lime, 0.5 pound of BENTONE 38 organophilic hectorite, 6 pounds of CELLEX HV CMC, and 10 pounds of VEN-FYBER 201 micronized cellulose.

This additive, when mixed with water in the amount of 2 gallons per barrel of water, i.e. about 5% by volume, is effective as a spacer fluid for use in oil and gas well operations as evidenced by the following test: To a one gallon container having a conical bottom and an opening and delivery tube in the center was attached a 3 foot length of tygon tubing. The tubing was placed in a "finger" pump which thus pumps out of the container and into a 5 gallon can. The container is filled with water containing some blue food coloring, and the pumping initiated. As the fluid level decreases one gallon of the spacer fluid of this Example is added to the container, followed by one gallon of diesel fuel. No mixing of the water and the diesel fuel occurs.

I claim:

1. A fluid, pourable well servicing fluid additive comprising an oleaginous liquid, a water-soluble polymer selected from the group consisting of hydroxyethyl cellulose, carboxymethyl cellulose, hydroxyethyl carboxymethyl cellulose, guar gum, hydroxypropyl guar gum, hydroxyethyl guar gum, carboxymethyl guar gum, biopolymer gums derived from a bacterium of the genus xanthomonas, and mixtures thereof, an alkaline earth metal base, an organophilic clay gellant for said oleaginous liquid, and a fibrous material, wherein said oleaginous liquid is an organic liquid which has no substantial swelling effect on said water-soluble polymer, and wherein said fibrous material is derived from natural materials selected from the group consisting of asbestos, cotton, wood, bagasse, peat, sphagum moss, animal hair, and mixtures thereof.

2. The additive of claim 1 wherein said alkaline earth metal base is selected from the group consisting of calcium oxide, calcium hydroxide, magnesium oxide, and mixtures thereof, and wherein a dispersant for said organophilic clay is present wherein said dispersant is a low molecular weight polar organic liquid selected from the group consisting of alcohols containing from one to three carbon atoms, ketones containing from 3 to 4 carbon atoms, nitroalkanes containing from 1 to 3 carbon atoms, alkylene carbonates containing from 3 to 5 carbon atoms, and mixtures thereof.

3. The additive of claim 2 wherein said water-soluble polymer is hydroxyethyl cellulose, said organophilic clay is selected from the group consisting of dimethyl dihydrogenated tallow ammonium smectite, dimethyl benzyl hydrogenated tallow ammonium smectite, methyl benzyl dihydrogenated tallow ammonium smectite, and mixtures thereof, and wherein said fibrous material is a fine particle size cellulose fiber derived from cotton or wood.

4. The additive of claim 1, 2, or 3, wherein said water-soluble polymer is present in an amount from about 7.5% to about 25% by weight, said alkaline earth metal base is present in an amount from about 2.5% to about 15% by weight, said gellant is present in an amount from about 0.5% to about 3% by weight, said dispersant is present in an amount from about 0% to about 1.0% by weight, said fibrous material is present in an amount from about 5% to about 20% by weight, and said oleaginous liquid is present in an amount from about 50% to about 75% by weight.

5. The additive of claim 1, 2, or 3, wherein said water-soluble polymer is present in an amount from about 10% to about 20% by weight, alkaline earth metal base is present in an amount from about 5% to about 10% by weight, said gellant is present in an amount from about 1.0% to about 2.0% by weight, said dispersant is present in an amount from about 0% to about 1.0% by weight, said fibrous material is present in an amount from about 8% to about 15% by weight, and said oleaginous liquid is present in an amount from about 60% to about 70% by weight.

6. In a method of drilling a well into a subterranean formation in which as aqueous drilling fluid containing clayey material is circulated into the well, the steps of increasing the carrying capacity of said drilling fluid, which comprises admixing with said drilling fluid from about 0.2% to about 3% by volume of the additive of claim 1, 2, or 3.

7. An aqueous well servicing fluid comprising water and from about 0.2% to about 15% by volume of the additive of claim 1, 2, or 3.

8. An aqueous spacer fluid which comprises water and from about 2.5% to about 7.5% by volume of the additive of claim 1, 2, or 3.

9. An aqueous lost circulation pill which comprises an aqueous liquid and from about 1.5% to about 15% by volume of the additive of claim 1, 2, or 3.

* * * * *